(12) United States Patent
Tan

(10) Patent No.: US 11,604,140 B2
(45) Date of Patent: Mar. 14, 2023

(54) OPTICAL SENSOR OF BIO-MOLECULES USING INTERFEROMETER

(71) Applicant: Access Medical Systems, Ltd., Palo Alto, CA (US)

(72) Inventor: Hong Tan, San Jose, CA (US)

(73) Assignee: ACCESS MEDICAL SYSTEMS, LTD., Palo Alto, CA (US)

( * ) Notice: Subject to any disclaimer, the term of this patent is extended or adjusted under 35 U.S.C. 154(b) by 980 days.

(21) Appl. No.: 16/380,616

(22) Filed: Apr. 10, 2019

(65) Prior Publication Data

US 2019/0302016 A1 Oct. 3, 2019

Related U.S. Application Data

(63) Continuation of application No. PCT/US2017/056114, filed on Oct. 11, 2017.
(Continued)

(51) Int. Cl.
*G01N 21/45* (2006.01)
*G01J 3/02* (2006.01)
(Continued)

(52) U.S. Cl.
CPC ............... *G01N 21/45* (2013.01); *G01J 3/024* (2013.01); *G01J 3/0208* (2013.01); *G01J 3/0218* (2013.01); *G01J 3/0224* (2013.01); *G01J 3/45* (2013.01); *G01N 21/7703* (2013.01); *G01N 21/8507* (2013.01); *G01B 11/0625* (2013.01); *G01J 3/453* (2013.01); *G01N 21/55* (2013.01);
(Continued)

(58) Field of Classification Search
CPC ......... G01N 2021/458; G01N 21/7703; G01N 21/45; G01J 3/0208
See application file for complete search history.

(56) References Cited

U.S. PATENT DOCUMENTS 5,042,925 A 8/1991 Broer et al.
5,172,192 A 12/1992 Prather
(Continued)

FOREIGN PATENT DOCUMENTS

CN 105388625 A * 3/2016 ........... G02B 27/283
WO WO-2006014410 A1 * 2/2006 ........... G01N 21/251
(Continued)

OTHER PUBLICATIONS

Weijian Shang, "A Fabry-Perot Interferometry Based MRI-Compatible Miniature Uniaxial Force Sensor for Percutaneous Needle Placement", 2013 (Year: 2013).*
(Continued)

*Primary Examiner* — Maurice C Smith
(74) *Attorney, Agent, or Firm* — Perkins Coie LLP; Viola Kung; Andrew Pettit

(57) ABSTRACT

The present invention is directed to an assembly for use in detecting an analyte in a sample based on thin-film spectral interference. The assembly includes a light source to emit light signals; a light detector to detect light signals; a coupler to optically couple the light source and the light detector to a waveguide tip; a monolithic substrate having a coupling side and a sensing side; and a lens between the waveguide tip and the monolithic substrate. The lens relays optical signals between the waveguide tip and the monolithic substrate.

22 Claims, 8 Drawing Sheets

Related U.S. Application Data

(60) Provisional application No. 62/406,815, filed on Oct. 11, 2016.

(51) Int. Cl.
  *G01J 3/45* (2006.01)
  *G01N 21/77* (2006.01)
  *G01N 21/85* (2006.01)
  G01N 21/55 (2014.01)
  G01J 3/453 (2006.01)
  G01B 11/06 (2006.01)

(52) U.S. Cl.
  CPC . *G01N 2021/458* (2013.01); *G01N 2021/772* (2013.01); *G01N 2201/0826* (2013.01); *G01N 2201/0833* (2013.01)

(56) References Cited

U.S. PATENT DOCUMENTS

| | | | |
|---|---|---|---|
| 5,804,453 A | * | 9/1998 | Chen ................ G01N 33/54373 422/82.07 |
| 7,327,454 B2 | | 2/2008 | Cunningham et al. |
| 8,305,585 B2 | | 11/2012 | Tan et al. |
| 8,383,414 B2 | | 2/2013 | Reynolds et al. |

FOREIGN PATENT DOCUMENTS

| | | | | |
|---|---|---|---|---|
| WO | WO-2010101931 A2 | * | 9/2010 | ........... C08B 37/006 |
| WO | WO-2015028571 A | * | 3/2015 | ......... G01N 21/7703 |

OTHER PUBLICATIONS

Altechna, "Polarizing Cubes for High Power Application" https://www.youtube.com/watch?v=eYKwCcuar5Q, 2013 (Year: 2013).*

G. De Diego-Castilla, et al., "A Photonic Biosensor for Space Applications (PBSA)", 46th Lunar and Planetary Science Conference, 2015.

International Search Report dated Dec. 22, 2017 issued in PCT/US2017/056114.

* cited by examiner

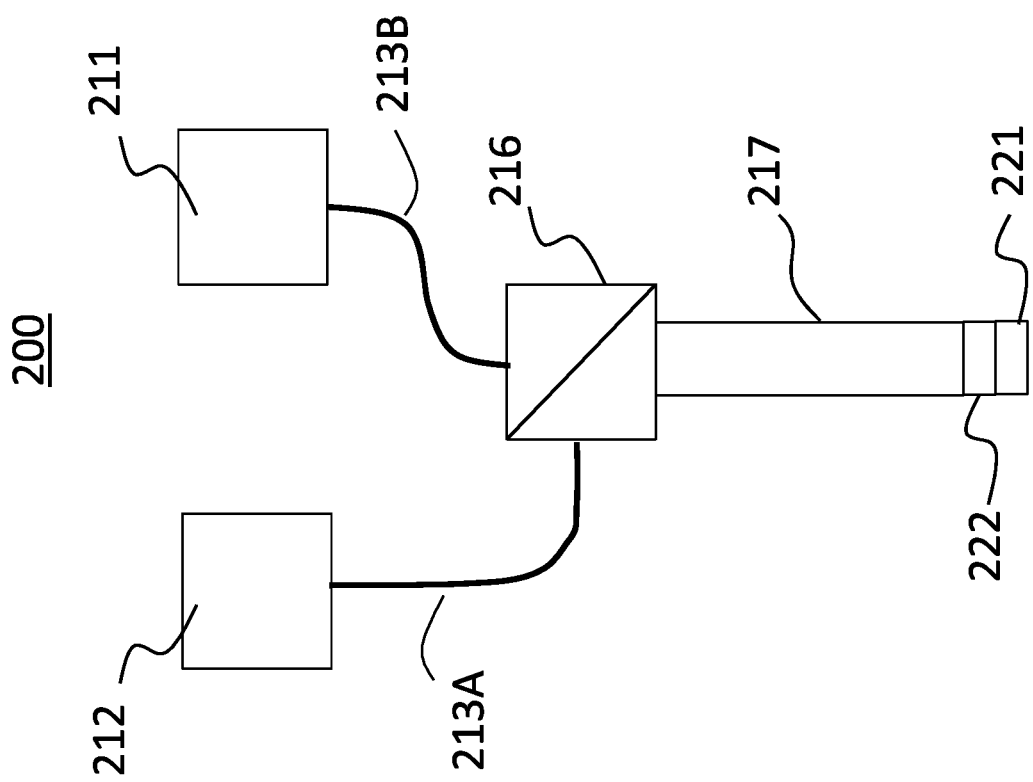

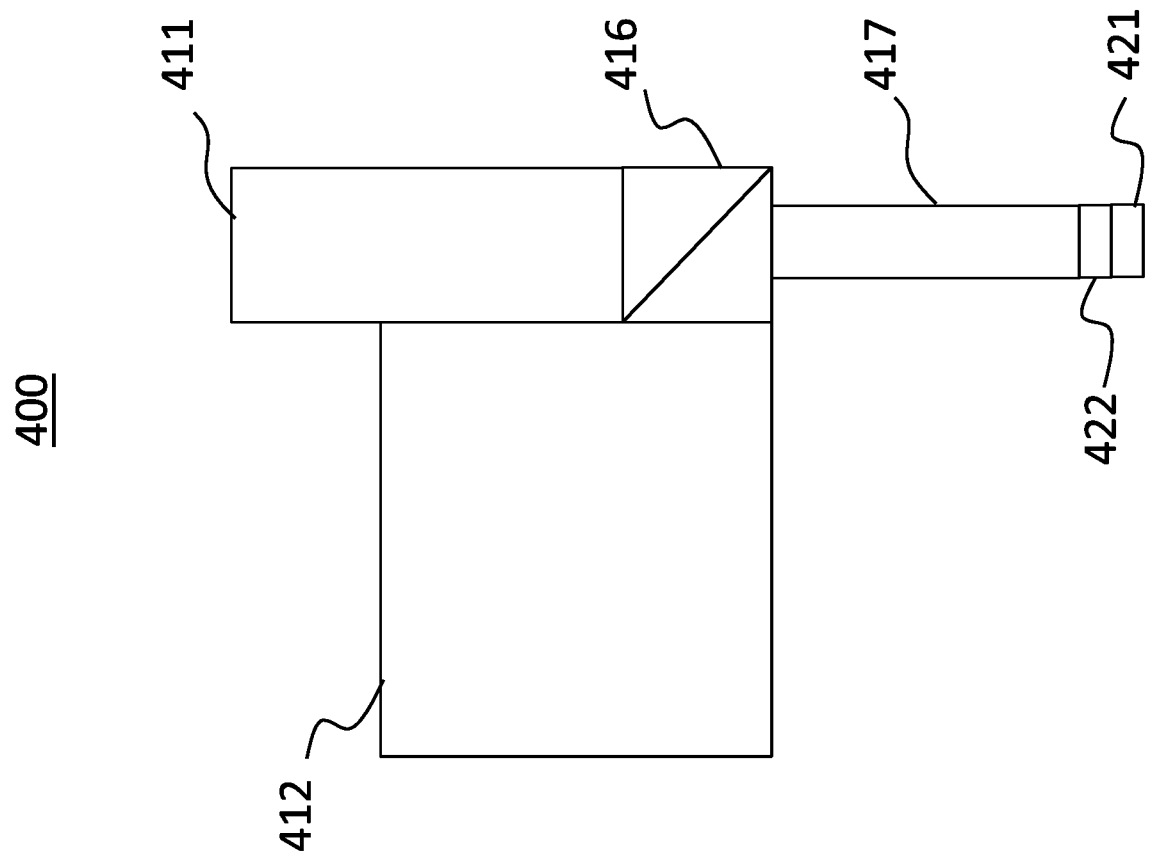

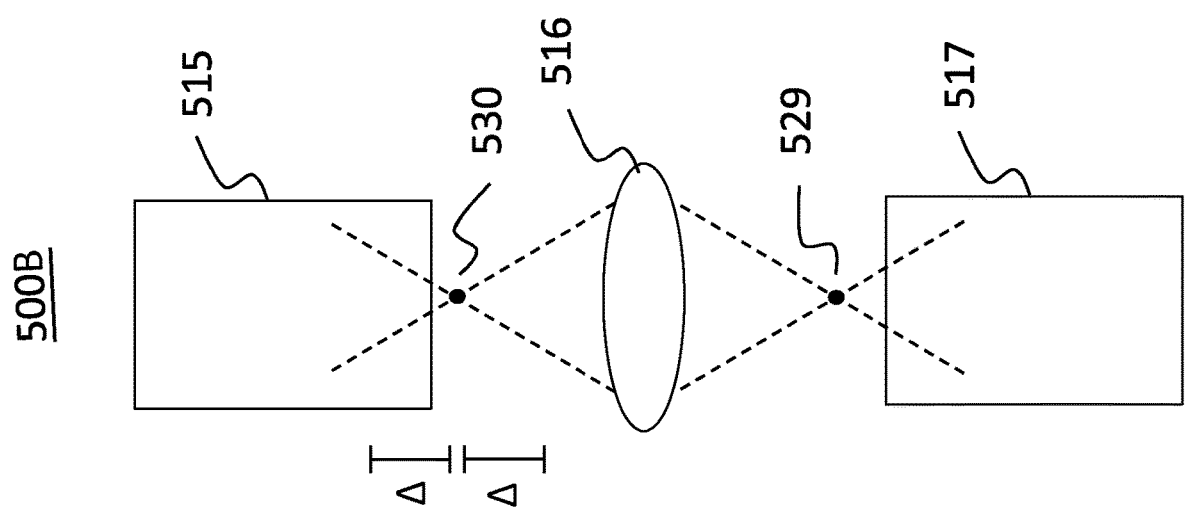

OPTICAL SENSOR OF BIO-MOLECULES USING INTERFEROMETER

This application is a continuation of PCT/US2017/056114, filed Oct. 11, 2017; which claims the benefit of U.S. Provisional Application No. 62/406,815, filed Oct. 11, 2016. The contents of the above-identified applications are incorporated herein by reference in their entirety.

TECHNICAL FIELD

This invention relates to an apparatus that improves detecting the presence, amount, or rate of binding of one or more analytes in a sample, and in particular an apparatus utilizing thin-film interferometer technology.

BACKGROUND OF THE INVENTION

Analytical tests based on a binding event between members of an analyte-anti-analyte binding pair are widely used in medical, veterinary, agricultural and research applications. Typically, such methods are employed to detect the presence or amount of an analyte in a sample, and/or the rate of binding/separating of the analyte to/from the anti-analyte. Typical analyte-anti-analyte pairs include complementary strands of nucleic acids, antigen-antibody pairs, and receptor-receptor binding agent, where the analyte can be either member of the pair, and the anti-analyte molecule is the opposite member.

Analysis methods of this type often employ a solid surface having immobilized anti-analyte molecules to which sample analyte molecules will bind specifically. In this type of assay, known as a solid-phase assay, the solid surface is exposed to the sample under conditions that promote analyte binding to immobilized anti-analyte molecules. The binding event can be detected directly, e.g., by a change in the mass, reflectivity, thickness, color or some other characteristic indicative of a binding event. Where the analyte is pre-labeled, e.g., with a chromophore, or fluorescent or radiolabel, the binding event is detectable by the presence and/or amount of detectable label at the detection zone. Alternatively, the analyte can be labeled after it is bound at the detection zone, e.g., with a secondary, fluorescent-labeled anti-analyte antibody.

U.S. Pat. No. 5,804,453 discloses a method of determining the concentration of a substance in a sample solution, using a fiber optic probe having a reagent at its distal end to which the substance bonds, the method comprising steps of: a) immersing the distal end of the fiber optic probe into the sample solution; b) optically coupling a light source with a proximal end of the fiber optic probe; c) detecting a first light beam, and a second light beam, reflected at the distal end of the fiber optic probe; d) detecting an interference pattern formed by the first and second light beams at a first time; e) detecting an interference pattern formed by the first and second light beams at a second time; and f) determining whether the substance is present in the sample solution based on whether a shift occurs in the interference patterns.

U.S. Pat. No. 7,394,547 is directed to an assembly for use in detecting an analyte in a sample based on interference, comprising: an optical fiber having a tip; a first optical element adapted for coupling to a light source through a mechanical coupling that engages the first optical element with the fiber and provides an air gap between the first optical element and the fiber; and second optical element attached to the first optical element, the second optical element commensurate in size with the fiber tip and adapted for coupling to the first optical element, said second optical element comprising a transparent material, a first reflecting surface, and a second reflecting surface separated from the first reflecting surface by the transparent material, said first and second reflecting surfaces separated by at least 50 nm, wherein said first reflecting surface comprises a layer of analyte-binding molecules, and an interference between light reflected into the fiber from said first and second reflecting surfaces varies as analyte in the sample binds to the analyte-binding molecules. The principle of detecting an analyte in a sample based on the changes of spectral interference is described in this reference, which is incorporated herein by reference.

There exists a need for improvements in the performance of the interferometer.

BRIEF DESCRIPTION OF THE FIGURES

FIG. 2 illustrates an example of a biosensor interferometer including a beamsplitter.

FIG. 4 illustrates another example of an integrated biosensor interferometer.

FIGS. 5A and 5B illustrate the optics principles of a lens of a biosensor interferometer.

DETAILED DESCRIPTION OF THE INVENTION

Definitions

Terms used in the claims and specification are to be construed in accordance with their usual meaning as understood by one skilled in the art except as defined below.

"About," as used herein, refers to within ±10% of the recited value.

An "analyte-binding" molecule, as used herein, refers to any molecule capable of participating in a specific binding reaction with an analyte molecule. Examples include, but are not limited to, (i) antigen molecules, for use in detecting the presence of antibodies specific against that antigen; (ii) antibody molecules, for use in detecting the presence of antigens; (iii) protein molecules, for use in detecting the presence of a binding partner for that protein; (iv) ligands, for use in detecting the presence of a binding partner; or (v) single stranded nucleic acid molecules, for detecting the presence of nucleic acid binding molecules.

A "ferrule," as used herein, refers to a rigid tube that confines or holds a waveguide as part of a connector assembly.

"Interference", as used herein, is a phenomenon in which two waves superpose to form a resultant wave of greater, lower, or the same amplitude.

An "interferometer," as used herein, refers to a device that merges multiple sources of light to create an interference pattern that can be measured and analyzed.

A "monolithic substrate," as used herein, refers to a single piece of a solid material such as glass, quartz, or plastic that has one refractive index.

A "probe," as used herein, refers to a monolithic substrate coated with a thin-film layer at the sensing side.

A "waveguide," as used herein, refers to a device (e.g., a duct, coaxial cable, or optic fiber) designed to confine and direct the propagation of electromagnetic waves (as light); for example, a waveguide can be a metal tube for channeling ultrahigh-frequency waves.

A "waveguide connector," as used herein, refers to a mechanical device for optically joining the locking together separable mating parts of a waveguide system. It is also known as a waveguide coupler.

Technology Overview

Figure 1A:
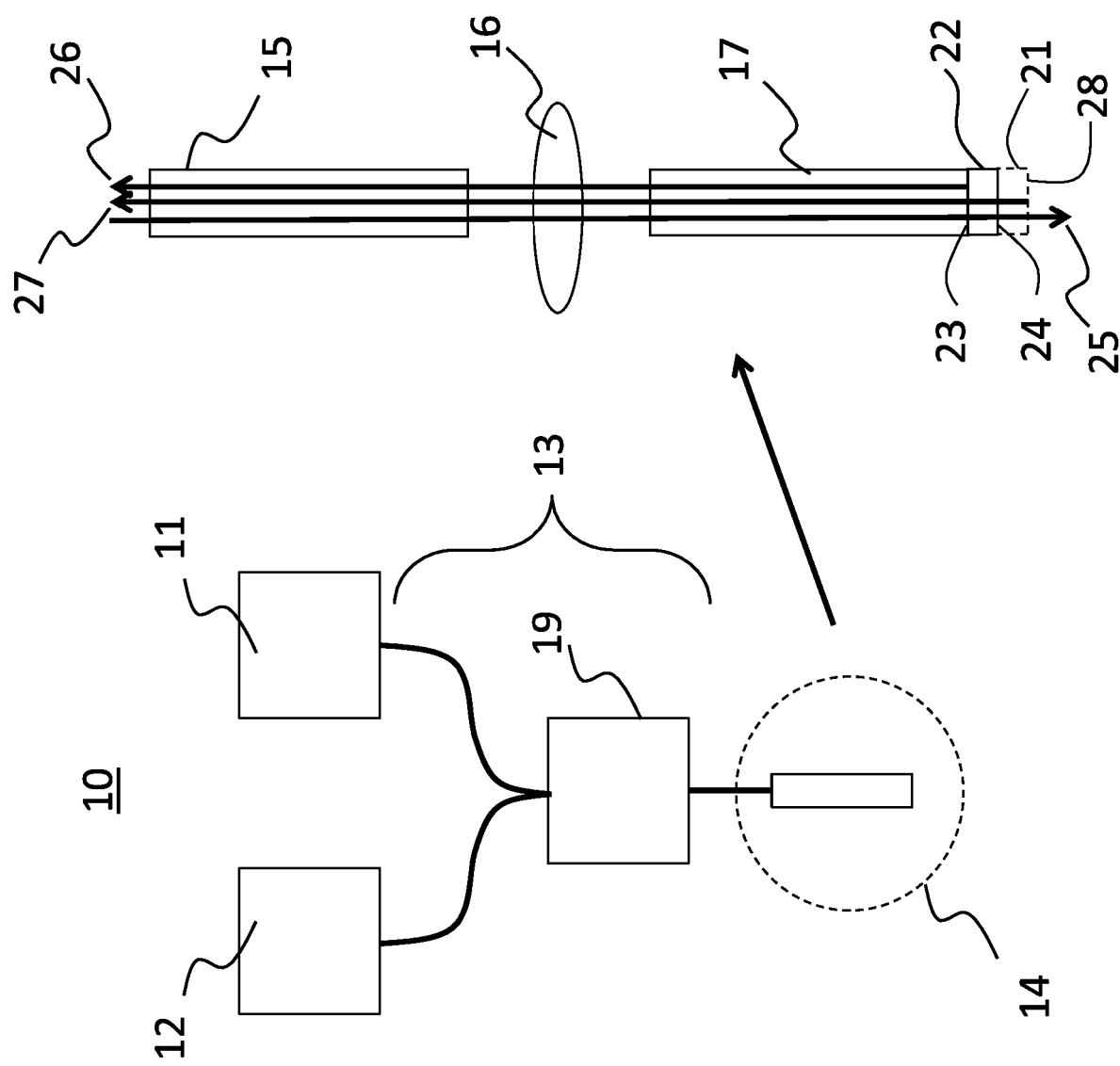
FIG. 1A illustrates an example of a biosensor interferometer including at least one lens.

FIG. 1A illustrates an example of a biosensor interferometer 10 including a lens 16. A biosensor interferometer 10 comprises a light source 11, a detector 12, a waveguide coupler 19, waveguide 13 and an optical assembly 14. The optical assembly 14 comprises the tip of the waveguide (also referred to as waveguide tip) 15, a lens 16, a monolithic substrate 17, a thin-film layer (interference layer) 22 and a biomolecular layer 21. The thin-film layer 22 can include a transparent material. The thin-film layer 22 has a surface 24 and a reflecting surface 23. The layer of biomolecular molecules 21 is attached to the thin-film layer 22 at the surface 24. The reflecting surface 23 is between the thin-film layer 22 and the monolithic substrate 17. The surface 24 between the thin-film layer 22 and the biomolecular layer 21 is also referred to as a "sensing surface."

A light source 11 in the bio-sensor interferometer 10 can be a white light source, such as a light-emitting diode (LED) which produces light over a broad spectrum, e.g., 400 nm or less to 700 nm or greater, typically over a spectral range of at least 100 nm. Alternatively, the light source 11 can be a plurality of light sources each having a different characteristic wavelength, such as LEDs designed for light emission at different selected wavelengths in the visible light range. The same function can be achieved by a single light source, e.g., a white light source, optionally with suitable filters for directing light with different selected wavelengths onto the optical assembly 14.

A detector 12 is preferably a spectrometer, such as Ocean Optics USB4000, capable of recording the spectrum of the reflected interfering light from the optical assembly 14. Alternatively, where the light source 11 operates to direct different selected wavelengths onto the optical assembly 11, the detector 12 can be a simple photodetector for recording light intensity at each of the different irradiating wavelengths. In still another embodiment, the detector 12 can include a plurality of filters which allows detection of light intensity, e.g., from a white light source, at each of a plurality of selected wavelengths of the interference reflectance wave.

A waveguide 13 transports a light signal from a light source 11 to an optical assembly 14, and transports reflected light signals from the optical assembly 14 to a detector 12. Commonly the waveguide 13 comprises a fiber bundle. A waveguide coupler 19 couples a fiber bundle of the waveguide 13 so that the optical assembly 14 is optically coupled to the light source 11 and the detector 12.

A lens 16 optically couples the waveguide 13 and the monolithic substrate 17. The lens 16 is not necessarily, but it may be, in direct contact with the waveguide 13 and/or the monolithic substrate 17. In operation, the lens 16 receives incident light signal 25 from waveguide tip 15 and relays the incident light signal 25 into the monolithic substrate 17. The lens 16 further receives reflected light signals 26 and 27 from the monolithic substrate 17 and relays the reflected light signals 26 and 27 back to the waveguide tip 15.

The lens 16 can be, e.g., a collimating lens that narrows the light signals to cause the light signals to be more aligned in a specific direction, as collimated light or parallel light rays. For example, the incident light signal 25 exiting the waveguide tip 15 can have a spatial cross section that is even larger than a cross section of the monolithic substrate 17. The collimating lens can cause the spatial cross section of the incident light signal 25 to become smaller so that most or all of the incident light signal 25 enters the monolithic substrate 17.

Similarly, the lens 16 can be, e.g., a focusing lens that focuses the incident light signal 25 with a focal point that is near or inside of the waveguide tip 15, and focuses the reflected light signals 26 and 27 with another focal point that is near or inside of the monolithic substrate 17. The focal length is typically between 1 millimeters (mm) and 100 mm, preferably 2-20 mm, 5-10 mm, or 4-6 mm. In some embodiments, the lens 16 can be a lens assembly, which includes a plurality of lens components, in order to achieve a more sophisticated optical profile.

The lens 16 can also be, e.g., a GRIN (gradient-index or graded-index) lens. The GRIN lens includes a gradual variation of the refractive index of a material. The variation of refractive index enables GRINS lenses to have flat surfaces. Due to the gradual variation of the refractive index, the GRIN lens can focus the incident light signal 25 with a focal point that is near or inside of the waveguide tip 15.

A monolithic substrate 17 made of a monolithic dielectric material is coupled to a tip of a waveguide 13 through a lens 16. The cross section of the monolithic substrate 17 may be round, square, triangular, oval, or rectangular shaped. In a preferred embodiment, the aspect ratio of the monolithic substrate (length to width or length to diameter) is at least 5:1. The monolithic substrate 17 works effectively as an optical waveguide when the incident light signal 25 enters the monolithic substrate's proximal surface at a certain angle that still allows a total internal reflection. In this embodiment, this angle is defined by the combination of the numerical aperture of the lighting optic fiber, the monolithic substrate 17, and the mechanical coupling angle between the monolithic substrate 17 and the lighting optic fiber.

The interference layer 22 (also referred to as a "thin-film layer") is a substantially transparent material coated on the sensing side of the monolithic substrate 17. Thin films are thin material layers ranging from fractions of a nanometer (monolayer) to several micrometers in thickness. Electronic semiconductor devices and optical coatings are the main applications benefiting from thin film construction. The thin-film layer 22 of the present invention typically has a thickness of at least 50 nm, and preferably at least 100 nm. An exemplary thickness is between about 100-5,000 nm, preferably 400-1,000 nm. The refractive index of the thin-film layer 22 is preferably similar to that of the biomolecular layer 21, so that reflection from the lower distal end of the optical assembly 14 occurs predominantly from the biomolecular layer 21, rather than from the interface between the monolithic substrate 17 and the analyte-binding molecules. The biomolecular layer 21 is initially formed by the analyte-binding molecules. After a period of time, the biomolecular layer 21 may also include analyte molecules that have binded to the analyte-binding modules. Thus, the biomolecular layer 21 may include analyte molecules and/or analyte-binding molecules.

Similarly, as analyte molecules bind to the lower layer of the optical assembly 14, light reflection form the lower end of the optical assembly 14 occurs predominantly from the biomolecular layer 21 formed by the analyte-binding molecules and bound analyte, rather than from the interface region. One exemplary material forming the thin-film layer is silicon dioxide (SiO$_2$). The thin-film layer 22 can also be formed using a similar transparent polymer as the monolithic substrate 17, such as polystyrene (PS) or polyethylene (PE).

The thickness of the biomolecular layer 21 is designed to optimize the overall sensitivity based on specific hardware and optical components. Conventional immobilization chemistries are used in chemically, e.g., covalently, attaching a layer of analyte-binding molecules to the lower surface of the optical element. For example, a variety of bifunctional reagents containing a siloxane group for chemical attachment to SiO$_2$, and a hydroxyl, amine, carboxyl or other reaction group for attachment of biological molecules, such as proteins (e.g., antigens, antibodies), or nucleic acids. It is also well known to etch or otherwise treat a glass surface to increase the density of hydroxyl groups by which analyte-binding molecules can be bound. When the thin-film layer 22 is formed of a polymer, such as polystyrene, a variety of methods are available for exposing available chemically-active surface groups, such as amine, hydroxyl, and carboxyl groups.

The analyte-binding layer is preferably formed under conditions in which the distal surface of the optical element is densely coated, so that binding of analyte molecules to the layer forces a change in the thickness of the layer, rather than filling in the layer. The analyte-binding layer can be either a monolayer or a multi-layer matrix.

The measurement of the presence, concentration, and/or binding/separating rate of analyte to the optical assembly is performed by the interference of reflected light beams from the two reflecting surfaces in the optical assembly. Specifically, as analyte molecules attach to or detach from the surface, the average thickness of the biomolecular layer 21 changes accordingly. Because the thickness of all other layers remains the same, the interference wave formed by the light waves reflected from the two surfaces is phase shifted in accordance with the thickness change due to the analyte binding.

In operation, incident light signal 25 is emitted from the light source 11 and is transported through the waveguide 13. The incident light signal 25 is transmitted through the lens 16 to the monolithic substrate 17, and then subsequently transmitted to the thin-film layer 22 and the biomolecular layer 21. Within the optical assembly 14, light is reflected at the reflecting surface 23 resulting in a reflected light signal 26. Additionally, light is reflected at a reflecting surface 28 of the biomolecular layer 21, resulting in the reflected light signal 27. Before analyte binding, the reflecting surface 28 of the biomolecular layer 21 is a surface between a layer of biomolecules (analyte-binding molecules) and the sample solution. After analyte binding, the reflecting surface 28 becomes the surface between a layer of analyte molecules and the sample solution.

Figure 1C:
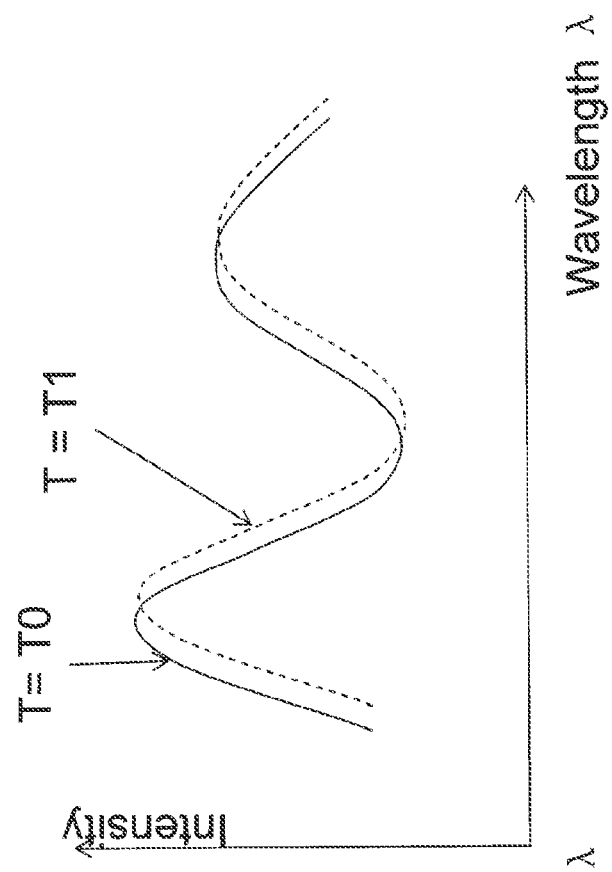
FIGS. 1B and 1C illustrate principles of detection in a thin-film interferometer.

The two light signals 26, 27 reflected from boundaries between the first and second reflecting surfaces 23, 28 generate a spectral interference pattern, as shown in FIG. 1C. When biomolecules bind to analyte molecules on the peripheral surface of the thin-film layer 22 to form an interference layer, the equivalent optical path of the second reflection signal 27 extends. As a result, the spectral interference pattern shifts from T0 to T1 as shown in FIG. 1C. By measuring the pattern's phase shift continuously in real time, a kinetic binding curve can be measured as the amount of shift vs. the time. The association rate of an analyte to a capture molecule immobilized on the surface can be used to calculate the analyte's concentration. Hence, the measurement of this phase shift is the detection principle of a thin-film interferometer. In some embodiments, the detector 12 identifies the spectral interference between light reflected into the waveguide tip from the reflecting surfaces 23, 28. Said another way, the detector 12 may determine the spectral interference as analyte molecules in the sample bind to or separate from the analyte-binding molecules.

Figure 1B:
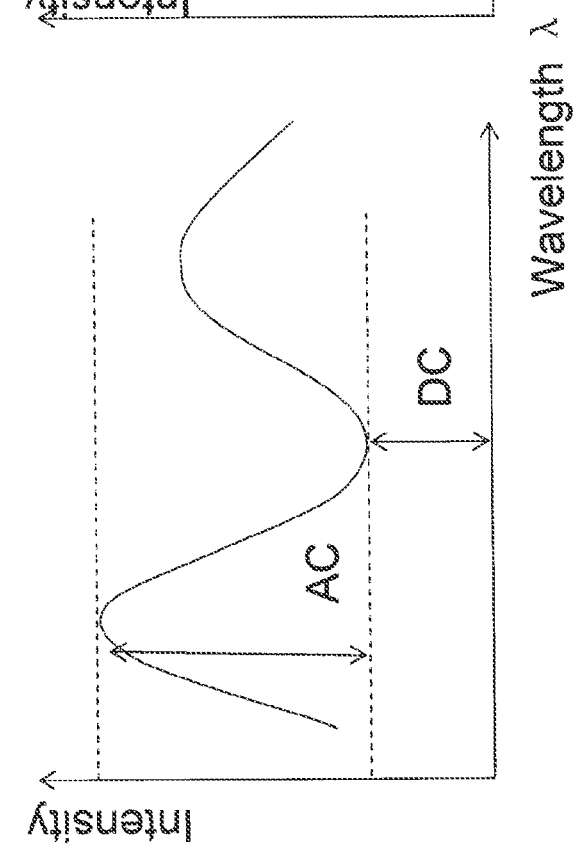

Referring to FIG. 1B, the performance of the biosensor interferometer can also be improved as the AC component is maximized and the DC offset is minimized. To achieve these objectives, one must increase the coupling efficiency for the incident light signal 25 from the light source 11 to the sensing surface 24 and the coupling efficiency for the reflected light signals 26, 27 from the first and second refracting surfaces 23, 28 to the spectrometer 12. Concurrently, the reflection from the other interfaces should be reduced as much as possible.

As shown in FIG. 1A, the waveguide 13 can connect to the light source 11 and the detector 12 (e.g., a spectrometer) so that light will be transported to the sensing surface of the optical assembly 14 and reflected light will be transported to the detector 12 for measurement. Multiple of such systems can be set up to achieve parallel detection. The detectors 12 can measure the reflected light from the sensing ends of the optical assemblies 14, and then output spectral interference patterns in real time that are a function of wavelengths and light intensity at each wavelength. A phase change in the form of a left shift of the peaks and valleys represents a reduction of the thin-film thickness (e.g., disassociation of molecules on the sensing surface), while a right shift represents an increase of the thin-film thickness (e.g., association of molecules on the sensing surface). By converting the interference pattern to a digital format, a computing device (e.g., a personal computer) can determine the amount of thickness change at any time instance. A binding curve (or an association curve and disassociation curve) can also be graphed with respect to the time. Kinetics of molecular interactions between two different molecules, one in solution and one immobilized on an optical assembly's sensing surface, can thus be analyzed. In a quantization assay, the concentration of the analyte molecules in solution can be derived from the kinetics, e.g., faster binding kinetics typically implies a higher concentration of analyte.

Figure 1D:
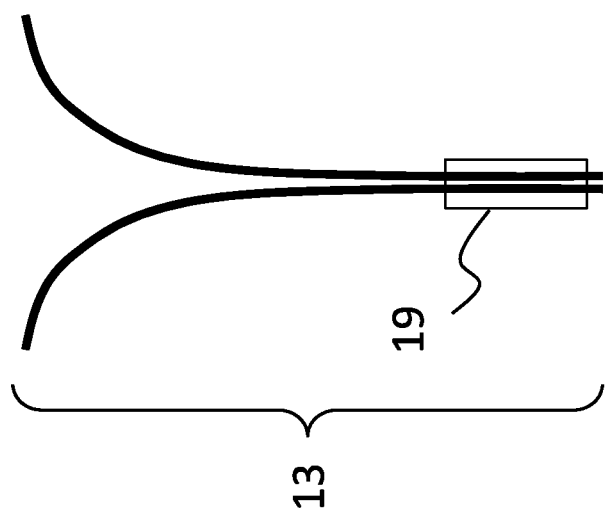
FIG. 1D illustrates an example of a waveguide.

FIG. 1D illustrates an example of a waveguide 13. More specifically, the waveguide 13 shown here includes a "bifurcated" fiber bundle having separate fibers for light guided from the light source 11 toward the monolithic substrate 17 and reflected light guided from the monolithic substrate 17 toward the detector 12. The waveguide 13 may also include a mechanical coupler 19 that holds the fibers together. Generally, the mechanical coupler 19 is positioned near the distal end of the waveguide 13 to hold the ends of the fibers near one another.

FIG. 2 illustrates an example of a biosensor interferometer 200 including a beam splitter 216. A biosensor interferometer 200 comprises a light source 211, a detector 212, a waveguide 213A, a waveguide 213B, a beam splitter 216 and a monolithic substrate 217.

The beam splitter 216 optically couples the monolithic substrate 217 to the detector 212 (through waveguide 213A) and the light source 211 (through waveguide 213B). In some embodiments, the beam splitter 216 can include two prisms that are connected together by a resin layer. The thickness of the resin layer is adjusted such that (for a certain wavelength) half of the light incident is reflected and the other half is transmitted due to frustrated total internal reflection.

Alternatively, the beam splitter 216 can include a birefringent material to split light into beams of different polarizations. In some other embodiments, the beam splitter 216 can include liquid crystal components. The liquid crystal components can serve as switches to turn optical gates on and off in a very fast pace so that a portion of the light is reflected and another portion of the light is transmitted. The biosensor interferometer 200 can include an interference layer 222 (also referred to as a "thin-film layer") and a biomolecular layer 221, similar to the interference layer 22 and the biomolecular layer 21 illustrated in FIG. 1A.

An advantage of the biosensor interferometer 200 is that the device does not necessarily include any bulky waveguide coupler. Since the dimension of a beam splitter 216 can be much smaller than a dimension of a waveguide coupler, a size of the interferometer 200 can be small. In some embodiments, the width of the beam splitter 216 can be, e.g., 2 mm. In some embodiments, the width of the beam splitter 216 can be from 0.5 to 10 mm, or 0.2 to 20 mm.

Figure 3:
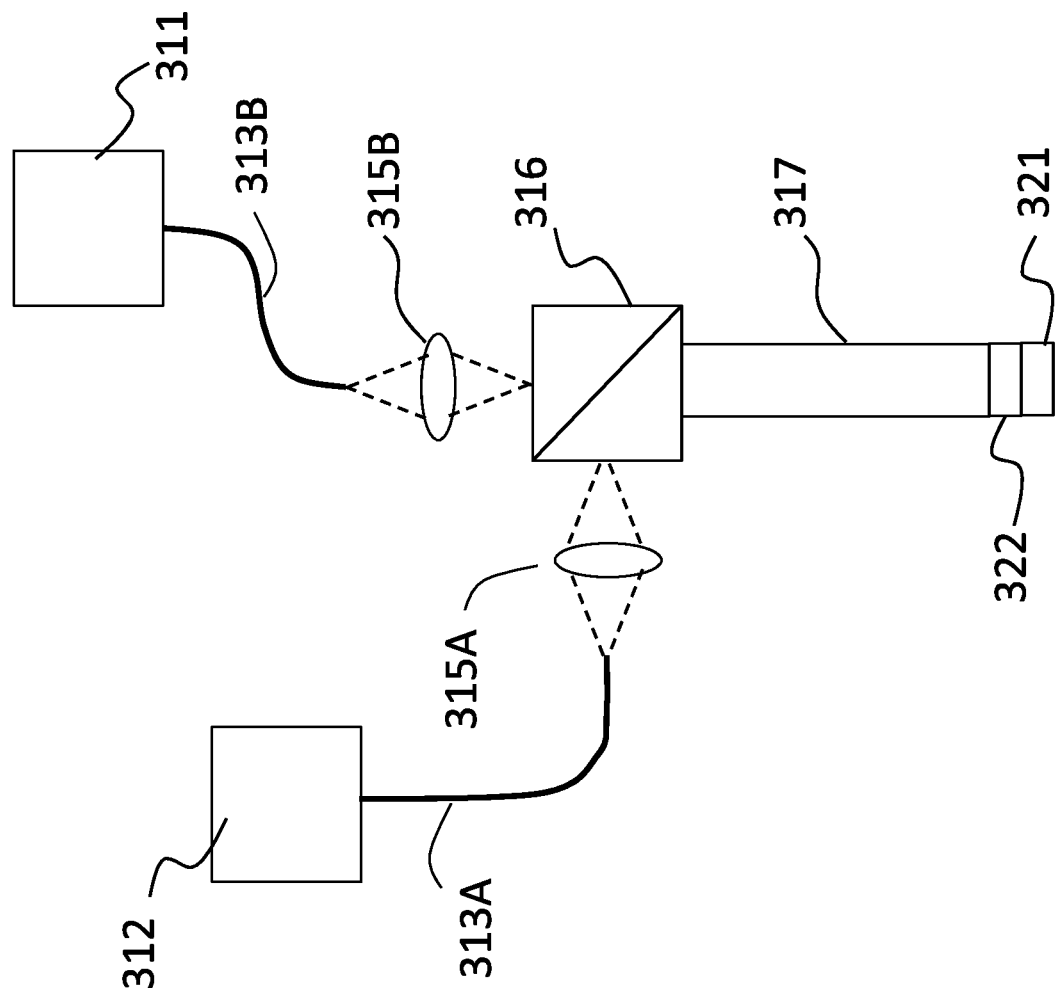
FIG. 3 illustrates another example of a biosensor interferometer including a beamsplitter and one or more lenses.

FIG. 3 illustrates another example of a biosensor interferometer 300 including a beam splitter 316. A bio-sensor interferometer 300 comprises a light source 311, a detector 312, a waveguide 313A, a waveguide 313B, a lens 315A, a lens 315B, a beam splitter 316 and a monolithic substrate 317. Instead of directly connecting waveguide 313B to the beam splitter 316, a lens 315B can receive the light from the light source 311 (through waveguide 313B) and relays the light to the beam splitter 316. Similarly, a lens 315A can optically couple the waveguide 313A with the beam splitter 316. Similar to the lens 16 illustrated in FIG. 1A, the lenses 315A and 315B can be, e.g., collimating lenses, focusing lenses, GRIN lenses, or any types of optical lenses that can relay the optical signals. The bio-sensor interferometer 300 can include an interference layer 322 (also referred to as a "thin-film layer") and a biomolecular layer 321, similar to the interference layer 22 and the biomolecular layer 21 illustrated in FIG. 1A.

In some embodiments, a biosensor interferometer does not necessarily include any waveguide or optical fiber. FIG. 4 illustrates an example of a biosensor interferometer 400 including integrated optical elements. An integrated biosensor interferometer 400 comprises a light source 411, a detector 412, a beam splitter 416 and a monolithic substrate 417. The light source 411, detector 412, beam splitter 416 and monolithic substrate 417 may all be integrated into a single integrated optical device. In some embodiments, the integrated bio-sensor interferometer 400 can be a photonic integrated circuit or a planar lightwave circuit. The optical components of the integrated bio-sensor interferometer 400 can be, e.g., fabricated on the surface of some crystalline materials.

In some embodiments, because the beam splitter 416 in the integrated interferometer is optically coupled to the light source 411, detector 412 and monolithic substrate 417 through air (or vacuum), there is no need to include any optical fiber for relaying the optical signals. Thus, another advantage of the integrated biosensor interferometer 400 is that the manufacture cost is low, because such an integrated bio-sensor interferometer 400 does not necessarily contain any costly optical fiber. In some alternative embodiments, the integrated bio-sensor interferometer 400 can include lenses for relaying the optical signals. Those lenses can be similar to the lens 16 illustrated in FIG. 1A or the lenses 315A, 315B illustrated in FIG. 3. The integrated biosensor interferometer 400 can include an interference layer 422 (also referred to as a "thin-film layer") and a biomolecular layer 421, similar to the interference layer 22 and the biomolecular layer 21 illustrated in FIG. 1A.

Figure 5A:
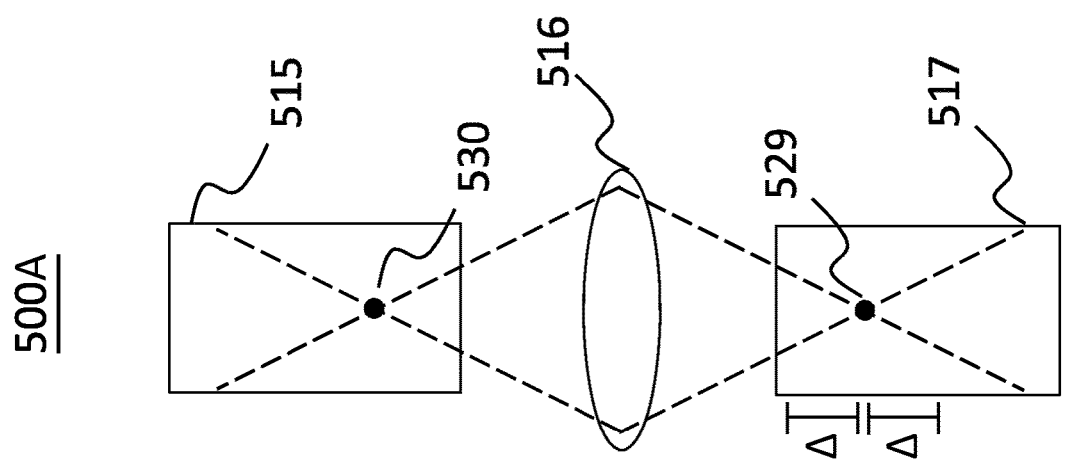

FIGS. 5A-B illustrate the optics principles of a lens 516 of a biosensor interferometer 500A-B. As noted above, the lens 516 can be, e.g., a focusing lens that focuses light leaving the waveguide tip 515 at a focal point 529 near (either inside or outside) the monolithic substrate 517, and that focuses light leaving the monolithic substrate 517 at a focal point 530 near (either inside or outside) the waveguide tip 515.

The focal distance can vary based on one or more characteristics of the lens 516. These characteristics can include the curvature of the lens 516, the lens material(s), etc. While the focal distance is typically between 1 mm and 100 mm away from the lens 516, specific lens(es) may be selected having specific focal distances. For example, a lens 516 may be selected such that the focal distance is about 4 mm. In such an embodiment, both the waveguide tip 515 and the monolithic substrate 517 may also be positioned about 4 mm away from the lens 516. The lens 516 may also be selected such that the focal distance is about 2-20 mm, 5-10 mm, etc.

Generally, the waveguide tip 515 is positioned such that substantially all of the light guided toward the waveguide tip 515 by the lens 516 actually enters the waveguide tip 515. Similarly, the monolithic substrate 517 is typically positioned such that substantially all of the light guided toward the monolithic substrate 517 by the lens 516 actually enters the monolithic substrate 517. However, the position of the waveguide tip 515 and/or the monolithic substrate 517 may vary slightly with respect to the focal points 529, 530. Here, for example, because the lens 516 focuses light guided toward the monolithic substrate 517 at focal point 529, the monolithic substrate could be moved up or down a specified distance (here, delta (Δ)) and still capture substantially all of the light.

The specified distance may vary based on the location of the focal point, the dimensions of the light exiting the lens 516, etc. For example, if the focal distance is short, then the width of the light exiting the lens 516 will change rapidly. Delta will typically be small in such a scenario because too much vertical movement of the monolithic substrate 517 or the waveguide tip 515 will cause light to fall outside the spatial cross section of the monolithic substrate 517 or the waveguide tip 515.

The apparatuses described in this application can be used for the following applications: (i) with an anti-species antibody carried on the tip, for screening hybridoma expression lines for cell lines with high antibody expression; (ii) with an antigen carried on the tip, to characterize high affinity antibodies against that antigen; (iii) with a protein carried on the tip, for identifying and characterizing binding partners (e.g., DNA, RNA, proteins, carbohydrates, or organic molecules) for that protein; (iv) with a carbohydrate or glycosyl moiety carried on the tip, for identifying and characterizing binding partners (e.g., DNA, RNA, proteins, carbohydrates, or organic molecules) for that carbohydrate; (v) with a protein that participates in a multi-protein complex carried on the tip, for characterizing the binding components and/or kinetics of complex formation; (vi) with a small protein-binding molecule carried on the tip, for identifying and characterizing protein binders for that molecule; (vii) with an antibody carried on the tip, for constructing a calibration curve for the analyte using a set of analytes standards. Using this calibration curve, one can then determine the concentration of the analyte in unknown solutions (e.g., cell culture supernatants, biological samples, process mixtures, etc). (viii) with a single-stranded nucleic acid (e.g., ssDNA or RNA) carried on the tip, for identifying and molecules that bind specifically to the nucleic acid.

The invention is illustrated further by the following examples that are not to be construed as limiting the invention in scope to the specific procedures described in them.

EXAMPLES

Example 1. Preparation of Streptavidin-Coated Probes

Preparing Aminopropropylsilane-Coated Probe

A glass rod (a monolithic substrate), 1 mm diameter and 2 cm in length, had both coupling end and sensing end polished. The sensing end was first coated with a $SiO_2$ coating layer (a thin-film layer) with a thickness of 650 nm using a physical vapor deposition technology, and then deposited with aminopropylsilane (APS) using a chemical vapor deposition process (Yield Engineering Systems, 1224P) following manufacturer's protocol. APS is deposited to enable protein immobilization. APS adsorbs protein to the surface of the probe by a combination of hydrophobic and ionic interaction. APS is only a monolayer, about 7 nm thick.

Preparing Cross-Linked Streptavidin

Cross-linked streptavidin (SA) was prepared in the following manner. 10 mg of Streptavidin monomer (Scripps Labs) dissolved at 10 mg/ml in 100 mM sodium phosphate buffer containing 150 mM NaCl, pH 7.2 (PBS) was derivatized with a 10M excess of the bifunctional reagent, N-succinimidyl-A-acetylthioacetate (SATA), dissolved at 40 mg/ml in dimethyl formamide, (DMF) for 2 hours. At the same time 10 mg of Streptavidin dissolved at 10 mg/ml in PBS was derivatized with a 10 M excess of the bifunctional reagent, sulfosuccinimidyl 4-(N-maleimidomethyl) cyclohexane-1-carboxylate (Sulfo-SMCC), dissolved at 40 mg/mi in water for 1 hour. The samples were purified to remove excess bi-functional reagents using 10 mL crosslinked dextran desalting columns. The purified samples were combined in equal molar ratios and degassed under vacuum. The combined volume was determined and then a quantity of 1 M hydroxylamine hydrochloride, previously degassed under vacuum, was added so that the final concentration of the Hydroxylamine Hydrochloride in the sample was 50 mM. The addition of hydroxylamine hydrochloride deblocks the acetylated sulfhydryl group on the SATA modified protein creating a free sulfhydryl group to react with the maleimide groups on the Sulfo-SMCC modified proteins. The reaction was carried out for 1 hour and 30 minutes at room temperature. Excess maleimide groups were capped with β-mercaptoethanol for 15 minutes. Excess sulfhydryl groups were capped with N-ethylmaleimide for 15 minutes. Then the sample was dialyzed against 5 L of PBS. The cross-linked SA is then purified in a S-300 column (GE Healthcare?).

Preparing Streptavidin-Coated Probe

The APS probe was dipped into cross-linked SA (100 µg/mL in PBS) under orbital shaking (1000 rpm) for 10 minutes; then the probe was washed in PBS for 15 seconds three times. The probe was then dipped into a 15% sucrose solution, followed by drying in a convention oven at 37 C for 30 minutes.

Example 2. C-Reactive Protein (CRP) Assay (Prophetic Example)

Anti-CRP Antibody is Biotinylated by a Standard Method.

The streptavidin probe of Example 1 is coated with biotinylated anti-CRP antibody for 5 to 10 minutes under 200-1000 rpm orbital shaking. The kinetic assay of CRP begins from equilibrating the anti-CRP coated probe into a buffer for 5 minutes. After that, the probe is dipped into a sample containing CRP for 15 to 30 minutes to observe the real time association between anti-CRP and CRP. The probe then goes back to the buffer for the dissociation of CRP from the anti-CRP, which is monitored from 5 to 60 minutes by the interferometer of the present invention. By analyzing the association curve and dissociation curves, kinetic parameters such as $k_{on}$, $k_{off}$ and Kd can be derived.

Example 3. Preparation of Protein A-Coated Probes

The APS probe of Example 1 was dipped into 1 mg/mL biotinylated BSA solution for 1 minutes under orbital shaking (1000 rpm); then the probe was washed in PBS for 15 seconds three times. Then the probe was dipped into crosslinked SA of Example 1 (100 µg/mL in PBS) for 10 minutes under orbital shaking (1000 rpm); then the probe was washed in PBS for 15 seconds three times.

The probe was coated with a third layer of biotinylated Protein A by dipping the probe in 200 µg/mL biotinylated Protein A for 2 minutes under 1000 rpm orbital shaking. The probe was then dipped in a 15% sucrose solution, followed by drying in a convection oven at 37° C. for 30 minutes.

Example 4. IgG Assay (Prophetic Example)

The kinetic assay of IgG begins from equilibrating the protein A coated probe into a buffer for 5 minutes. After that, the probe is dipped into a sample containing IgG for 2 minutes to observe the real time association between protein A and IgG by the interferometer of the present invention. The unknown concentration of protein A can be quantitated from the standard curve of the association binding curve.

The invention, and the manner and process of making and using it, are now described in such full, clear, concise and exact terms as to enable any person skilled in the art to which it pertains, to make and use the same. It is to be understood that the foregoing describes preferred embodiments of the present invention and that modifications may be made therein without departing from the scope of the present invention as set forth in the claims. To particularly point out and distinctly claim the subject matter regarded as invention, the following claims conclude this specification.

What is claimed is:

1. An optical device for use in analyzing an analyte in a sample based on thin-film spectral interference, comprising:
   a light source to emit light signals;
   a light detector to detect light signals;
   a monolithic substrate having a coupling side and a sensing side;
   a beam splitter that includes one or more liquid crystal components operable to manipulate optical gates such that at least some light signals are reflected and at least some light signals are transmitted therethrough;
   a first waveguide for optically coupling the light source and the beam splitter,
      wherein the beam splitter relays light signals from the first waveguide to the monolithic substrate;

a second waveguide for optically coupling the light detector and the beam splitter,
   wherein the beam splitter relays light signals from the monolithic substrate to the second waveguide;
a thin-film layer directly bonded to the sensing side of the monolithic substrate,
   wherein the thin-film layer comprises
      a first reflecting surface comprising a layer of analyte-binding molecules, and
      a second reflecting surface between the thin-film layer and the monolithic substrate;
whereby a spectral interference between light reflected into the beam splitter from the first and the second reflecting surfaces varies as analyte molecules in the sample bind to or separate from the analyte-binding molecules.

2. The optical device of claim 1, further comprising:
a first lens between the first waveguide and the beam splitter,
   wherein the first lens relays light signals from the first waveguide to the beam splitter; and
a second lens between the second waveguide and the beam splitter,
   wherein the second lens relays light signals from the beam splitter to the second waveguide.

3. The optical device of claim 2, wherein the first and second lenses are focusing lenses, collimating lenses, gradient-index or graded-index (GRIN) lenses, or a combination thereof.

4. The optical device of claim 1, wherein the beam splitter includes a birefringent material configured to split light signals into beams of different polarizations.

5. An optical device for use in analyzing an analyte in a sample based on thin-film spectral interference, comprising:
   a light source to emit light signals;
   a light detector to detect light signals;
   a monolithic substrate having a coupling side and a sensing side;
   a beam splitter configured to
      relay light signals from the light source to the monolithic substrate, and
      relay light signals from the monolithic substrate to the light detector;
   a thin-film layer directly bonded to the sensing side of the monolithic substrate,
      wherein the thin-film layer comprises
         a first reflecting surface comprising a layer of analyte-binding molecules, and
         a second reflecting surface between the thin-film layer and the monolithic substrate;
   whereby a spectral interference between light reflected into the beam splitter from the first and the second reflecting surfaces varies as analyte molecules in the sample bind to or separate from the analyte-binding molecules; and
   wherein the light source, the light detector, the monolithic substrate, and the beam splitter are integrated into a photonic integrated circuit.

6. The optical device of claim 5, further comprising:
a first waveguide for optically coupling the light source and the beam splitter,
   wherein the beam splitter relays light signals from the first waveguide to the monolithic substrate; and
a second waveguide for optically coupling the light detector and the beam splitter,
   wherein the beam splitter relays light signals from the monolithic substrate to the second waveguide.

7. The optical device of claim 6, further comprising:
a first lens between the first waveguide and the beam splitter,
   wherein the first lens relays light signals from the first waveguide to the beam splitter; and
a second lens between the second waveguide and the beam splitter,
   wherein the second lens relays light signals from the beam splitter to the second waveguide.

8. The optical device of claim 7, wherein the first and second lenses are focusing lenses, collimating lenses, gradient-index or graded-index (GRIN) lenses, or a combination thereof.

9. The optical device of claim 5, wherein the beam splitter includes a birefringent material configured to split light signals into beams of different polarizations.

10. An optical device for use in analyzing an analyte in a sample based on thin-film spectral interference, comprising:
   a light source to emit light signals;
   a light detector to detect light signals;
   a monolithic substrate having a coupling side and a sensing side;
   a beam splitter to configured to
      relay light signals from the light source to the monolithic substrate, and
      relay light signals from the monolithic substrate to the light detector;
   a thin-film layer directly bonded to the sensing side of the monolithic substrate,
      wherein the thin-film layer comprises
         a first reflecting surface comprising a layer of analyte-binding molecules, and
         a second reflecting surface between the thin-film layer and the monolithic substrate;
   whereby a spectral interference between light reflected into the beam splitter from the first and the second reflecting surfaces varies as analyte molecules in the sample bind to or separate from the analyte-binding molecules; and
   wherein the light source, the light detector, the monolithic substrate, and the beam splitter are integrated into a planar lightwave circuit.

11. The optical device of claim 10, further comprising:
a first waveguide for optically coupling the light source and the beam splitter,
   wherein the beam splitter relays light signals from the first waveguide to the monolithic substrate.

12. The optical device of claim 11, further comprising:
a second waveguide for optically coupling the light detector and the beam splitter,
   wherein the beam splitter relays light signals from the monolithic substrate to the second waveguide.

13. An optical device for use in analyzing an analyte in a sample based on thin-film spectral interference, comprising:
   a light source to emit light signals;
   a light detector to detect light signals;
   a monolithic substrate having a coupling side and a sensing side;
   a beam splitter to configured to
      relay light signals from the light source to the monolithic substrate, and
      relay light signals from the monolithic substrate to the light detector;

a thin-film layer directly bonded to the sensing side of the monolithic substrate,
 wherein the thin-film layer comprises
  a first reflecting surface comprising a layer of analyte-binding molecules, and
  a second reflecting surface between the thin-film layer and the monolithic substrate;
whereby a spectral interference between light reflected into the beam splitter from the first and the second reflecting surfaces varies as analyte molecules in the sample bind to or separate from the analyte-binding molecules; and
wherein the light source, the light detector, the monolithic substrate, and the beam splitter are fabricated onto a surface of a crystalline substrate.

14. The optical device of claim 13, further comprising:
a first waveguide for optically coupling the light source and the beam splitter,
 wherein the beam splitter relays light signals from the first waveguide to the monolithic substrate; and
a second waveguide for optically coupling the light detector and the beam splitter,
 wherein the beam splitter relays light signals from the monolithic substrate to the second waveguide.

15. The optical device of claim 14, further comprising:
a mechanical coupler that bundles the first and second waveguides together proximate to a waveguide assembly tip through which light signals travel.

16. The optical device of claim 15, further comprising:
a lens between the waveguide assembly tip and the monolithic substrate.

17. The optical device of claim 16,
wherein the lens focuses light signals leaving the waveguide assembly tip at a first focal point near the monolithic substrate, and
wherein the lens focuses light signals leaving the monolithic substrate at a second focal point near the waveguide assembly tip.

18. An optical device for use in analyzing an analyte in a sample based on thin-film spectral interference, comprising:
a light source to emit light signals;
a light detector to detect light signals;
a monolithic substrate having a coupling side and a sensing side;
a waveguide assembly comprising
 a first waveguide that relays light signals from the light source to the monolithic substrate,
 a second waveguide that relays reflected light signals from the monolithic substrate to the light detector, and
 a mechanical coupler that bundles the first and second waveguides together proximate to a waveguide assembly tip through which light signals travel;
a lens disposed between the waveguide assembly tip and the monolithic substrate,
 wherein the lens relays optical signals between the waveguide assembly tip and the monolithic substrate; and
a thin-film layer directly bonded to the sensing side of the monolithic substrate,
 wherein the thin-film layer comprises
  a first reflecting surface comprising a layer of analyte-binding molecules, and
  a second reflecting surface between the thin-film layer and the monolithic substrate;
whereby a spectral interference between light reflected into the waveguide assembly tip from the first and the second reflecting surfaces varies as analyte molecules in the sample bind to or separate from the analyte-binding molecules.

19. The optical device of claim 18, wherein the thin-film layer is comprised of a transparent material.

20. The optical device of claim 18, wherein the lens is positioned a first specified distance away from the waveguide assembly tip, and wherein the lens is positioned a second specified distance away from the monolithic substrate.

21. The optical device of claim 20, wherein the first specified distance and the second specified distance are the same distance.

22. The optical device of claim 20, wherein the first and the second specified distances are based on a characteristic of the lens, and wherein the characteristic is selected from: curvature of an outer lens surface, a material of which the lens is comprised, or some combination thereof.

* * * * *